US008621657B2

(12) United States Patent
Lacroix

(10) Patent No.: US 8,621,657 B2
(45) Date of Patent: Dec. 31, 2013

(54) DEVICE AND METHOD FOR PROTECTING AN ELECTRONIC SYSTEM AGAINST UNAUTHORIZED ACCESS

(75) Inventor: Pierre Lacroix, Saint-Peray (FR)

(73) Assignee: Compagnie Industrielle et Financiere d'Ingenierie "Ingenico", Neuilly sur Seine (FR)

( * ) Notice: Subject to any disclaimer, the term of this patent is extended or adjusted under 35 U.S.C. 154(b) by 234 days.

(21) Appl. No.: 13/054,164

(22) PCT Filed: Jul. 15, 2009

(86) PCT No.: PCT/FR2009/051404
§ 371 (c)(1),
(2), (4) Date: Apr. 5, 2011

(87) PCT Pub. No.: WO2010/007314
PCT Pub. Date: Jan. 21, 2010

(65) Prior Publication Data
US 2011/0302664 A1    Dec. 8, 2011

(30) Foreign Application Priority Data

Jul. 17, 2008  (FR) ...................... 08 54862

(51) Int. Cl.
*G06F 21/00* (2013.01)
(52) U.S. Cl.
USPC .............................................. 726/34; 726/35
(58) Field of Classification Search
USPC ...................................................... 726/34–36
See application file for complete search history.

(56) References Cited

U.S. PATENT DOCUMENTS

| 6,983,378 | B1* | 1/2006 | Kokubo ........................... 726/26 |
| 2006/0225142 | A1 | 10/2006 | Moon |
| 2008/0074398 | A1 | 3/2008 | Wright |
| 2008/0278355 | A1* | 11/2008 | Moore et al. .................... 341/33 |

FOREIGN PATENT DOCUMENTS

| EP | 1542180 A | 6/2005 |
| WO | 2008140775 A | 11/2008 |

OTHER PUBLICATIONS

"Fringe-Effect Capacitive Proximity Sensors for Tamper Proof Enclosures", Halit Eren, et al., Sensors for Industry Conference, 2005, IEEE, PI, Feb. 1, 2005, pp. 22-26 XP031027733.
"CapSense? Express Software Tool", Ram Krishna Garg, Internet Article, (Online) Mar. 18, 2008, pp. 1-13, XP002514372, URL: http//download.cyrpess.com.edgesuite.net/design_resources/application_notes/contents/capsense_tm_express_software_tool_an42137_12.pdf.
International Search Report issued in PCT/FR2009/051404 on Jan. 13, 2010.
International Preliminary Report on Patentability and Written Opinion issued in PCT/FR09/51404 on Mar. 1, 2011.

* cited by examiner

*Primary Examiner* — Chau Le
(74) *Attorney, Agent, or Firm* — Vedder Price PC

(57) ABSTRACT

The invention relates to an electronic system comprising a printed circuit contained in a package. The system comprises a protection device comprising conducting tracks carried by the printed circuit and each having a free end; a first integrated circuit connected to the conducting tracks and adapted for detecting a variation in the capacitance seen by each conducting track; and a second integrated circuit, optionally merged with the first integrated circuit, comprising a configurable memory for selecting certain of the conducting tracks. The second integrated circuit is adapted for determining that an authorized or unauthorized access has occurred on the basis of the detection of the variation of the capacitance seen by at least one of the selected conducting tracks.

12 Claims, 2 Drawing Sheets

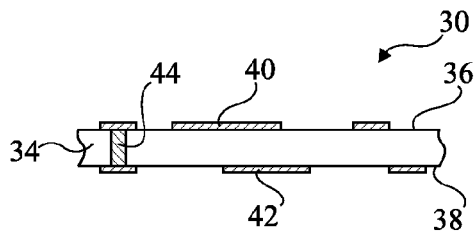
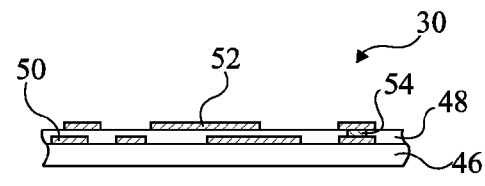
Fig 3      Fig 4
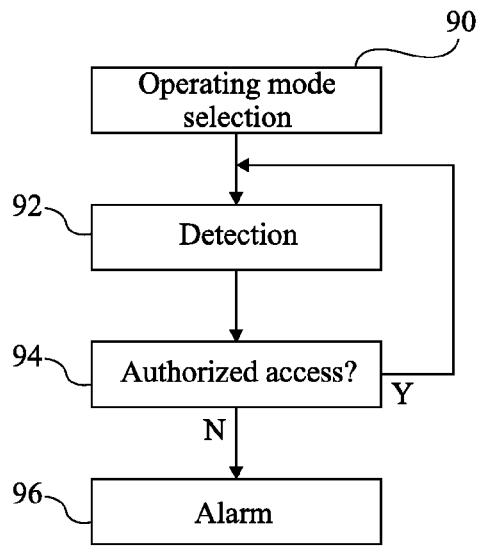
Fig 5
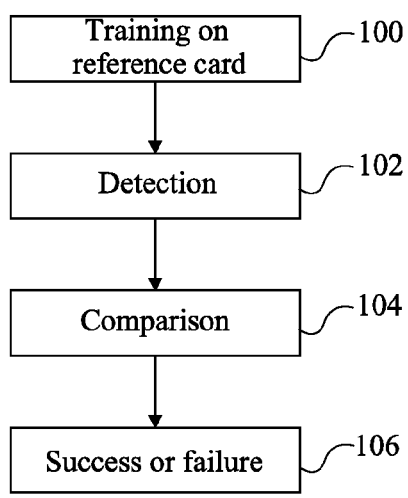
Fig 6

DEVICE AND METHOD FOR PROTECTING AN ELECTRONIC SYSTEM AGAINST UNAUTHORIZED ACCESS

FIELD OF THE INVENTION

The present invention relates to a device and a method for protecting an electronic system against an unauthorized access.

DISCUSSION OF PRIOR ART

Some electronic systems, for example, electronic payment terminals, comprise a printed circuit contained in a package. Electronic circuits may be welded on the two surfaces of the printed circuits or be electrically connected to the printed circuit. This concerns, for example, microprocessors, a memory card connector, a display screen, etc.

The security rules prescribed by accrediting bodies generally impose to provide protection devices enabling to prevent the access to certain electronic components attached to the printed circuit, for example, microprocessors.

A first example of a protection device adapted to an electronic payment terminal corresponds to dummy keys provided at the level of a membrane forming the keyboard of the terminal. A dummy key is connected to the rest of the membrane by a peripheral lip, like for a conventional key, but is not visible from the outside of the terminal.

When the terminal package is closed, the dummy key is permanently pressed by the package to bear against the printed circuit. In this case, the dummy key closes a switch provided at the integrated circuit level. The closing of the switch is detected by a processing circuit, not shown. When someone tries to open the package to access its content, the dummy key is no longer pressed by the package and is brought back by the lip to an idle position, causing the opening of the associated switch. The processing circuit is capable of detecting this opening, which indicates that an unauthorized opening of the package is occurring.

Another example of protection device adapted to an electronic payment terminal corresponds to a mesh device. Such a protection device corresponds, for example, to a flexible circuit comprising a stack of flexible and insulating films containing one or several conductive tracks, for example, made of copper. The tracks form security lines arranged in zigzag and connected to a processing circuit. The processing circuit is capable of determining whether a security line has been interrupted, the interruption of a security line corresponding to an unauthorized access to the printed circuit.

Each of the previously-described examples of protection devices has disadvantages. Indeed, in the case of protection devices with dummy keys, a user might, without opening the package and by eliminating, for example, by scraping, cutting, machining, grinding, etc., a portion of the keyboard membrane, access the metal tracks of the printed circuit and thus to information contained in the printed circuit without for an unauthorized access to be detected. Another disadvantage of a protection device with dummy keys is that an unauthorized access may be erroneously detected when a dummy key is displaced in the case where the electronic system package is submitted to a shock. Further, for a mesh protection device, a user could succeed in displacing, at least partly, the flexible circuit of the mesh device without interrupting the conductive tracks that it contains, and thus to have access to the metal tracks of the printed circuit without for an unauthorized access to be detected.

SUMMARY OF THE INVENTION

The present invention aims at a device for protecting an electronic circuit against unauthorized accesses to an electronic circuit contained in the electronic system package which is difficult to neutralize.

Another object of the present invention is a protection device relatively insensitive to shocks.

An object of an embodiment of the present invention is to provide a protection system configurable by product or by family of products.

To achieve this, an aspect of the present invention provides an electronic system comprising a printed circuit contained in a package. The system comprises a protection device comprising:

conductive tracks supported by the printed circuit and each having a free end and extending at the printed circuit level;

a first integrated circuit connected to the conductive tracks and capable of detecting a variation of the capacitance seen by each conductive track; and a second integrated circuit, possibly confounded with the first integrated circuit, comprising a memory configurable to select some of the conductive tracks. The second integrated circuit is capable of determining that an authorized or unauthorized access is occurring from the detection of the variation of the capacitance seen by at least one of the selected conductive tracks.

According to an embodiment of the invention, the memory configuration is different from one system to another or from one family of systems to another.

According to an embodiment of the invention, the pattern of said conductive tracks avoids the locations above the components supported by the printed circuit.

According to an embodiment of the invention, the printed circuit is rigid, the electronic system comprising an electronic component connected to the printed circuit by a flexible printed circuit, at least one of said conductive tracks extending at the level of the flexible printed circuit.

According to an embodiment of the invention, said conductive tracks are electrically isolated from one another and at least two of said conductive tracks overlap and/or are adjacent at the level of a portion of the printed circuit.

According to an embodiment of the invention, the first integrated circuit is connected to the second integrated circuit by a series connection.

Another aspect of the present invention provides a method for determining an unauthorized access to a printed circuit contained in a package of an electronic system. The method comprises the steps of:

providing conductive tracks, each having a free end and extending at least at the printed circuit level, a first integrated circuit connected to the conductive tracks, and a second integrated circuit, possibly confounded with the first integrated circuit, comprising a memory;

storing into the memory parameters for selecting some of the conductive tracks;

having the first integrated circuit detect, for each conductive track, whether the capacitance seen by the conductive track varies;

having the second integrated circuit determine that an authorized or unauthorized access is occurring from the detection of the variation of the capacitance seen by at least one of the selected conductive tracks.

According to an embodiment of the invention, each conductive track has a corresponding identifier. The method comprises having the first integrated circuit transmit to the second integrated circuit the identifier of the conductive track for which the capacitance variation is detected.

According to an embodiment of the invention, the parameters comprise at least a list of identifiers of at least some conductive tracks. The second integrated circuit determines that an authorized or unauthorized access is occurring if the identifier of the track for which the capacitance variation is detected belongs to the list.

According to an embodiment of the invention, the parameters comprise at least one logic operation involving the identifiers of at least some of the conductive tracks. The second integrated circuit determines that an authorized or unauthorized access is occurring if capacitance variations are detected for the conductive tracks associated with said identifiers and if the logic operation is verified.

According to an embodiment of the invention, several sets of parameters are stored in the memory. The method comprises providing the second integrated circuit with a signal for selecting a set of parameters from among said sets of parameters, said selected set of parameters being used by the second integrated circuit to determine that an authorized or unauthorized access is occurring.

According to an embodiment of the invention, the selection of the conductive tracks differs according to the system or to the system family.

According to an embodiment of the invention, the method further comprises the steps of:

determining calibration values based on a reference printed circuit;

calibrating the first integrated circuit of the printed circuit based on said calibration values; and having the first integrated circuit transmit a fault signal in the case where it detects a variation of the capacitance seen by at least one of the conductive tracks.

BRIEF DESCRIPTION OF THE DRAWINGS

The foregoing and other objects, features, and advantages of the present invention will be discussed in detail in the following non-limiting description of specific embodiments in connection with the accompanying drawings:

FIGS. 3 and 4 are partial simplified cross-section views of the printed circuit of FIG. 2; and FIGS. 5 and 6 illustrate, in the form of block diagrams, steps of examples of methods of use of the protection device of FIG. 2.

DETAILED DESCRIPTION

Figure 1:
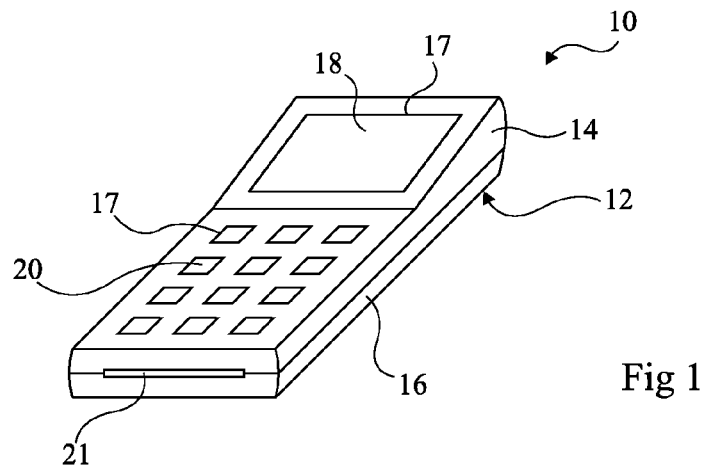
FIG. 1 schematically shows an electronic payment terminal.

For clarity, the same elements have been designated with the same reference numerals in the different drawings. Further, only those elements which are necessary to the understanding of the present invention will be described.

FIG. 1 schematically shows an embodiment of an electronic system 10, for example, an electronic payment terminal. Reader 10 comprises a package 12 formed of an upper package portion 14 connected to a lower package portion 16. Openings 17 are provided in upper package portion 14 for a display 18 and keys 20 belonging, for example, to a keyboard. Further, an opening 21 is provided in package 12 to enable the introduction of memory cards, for example, bank cards, not shown.

Figure 2:
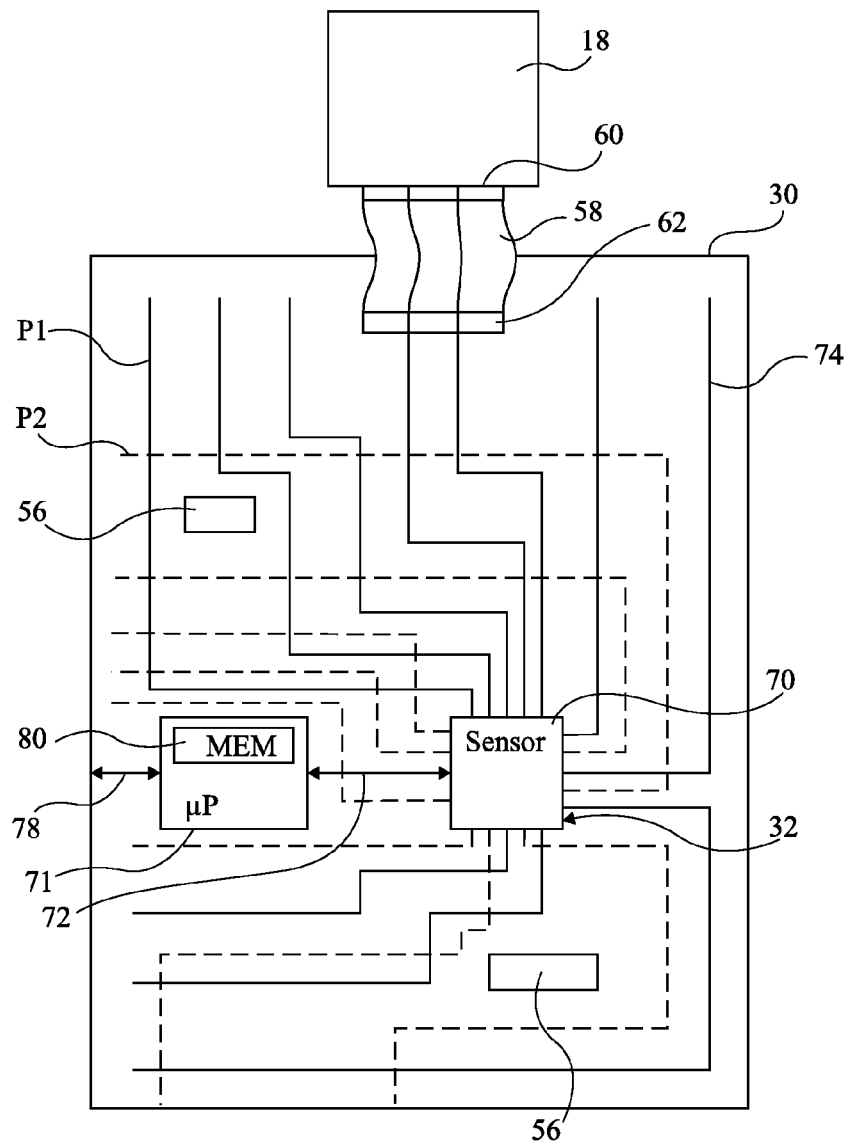
FIG. 2 is a simplified top view of a printed circuit of the terminal of FIG. 1 comprising a protection device according to an embodiment of the invention.

FIG. 2 is a simplified top view of an embodiment of a printed circuit 30 contained in package 12 and provided with a protection device 32 according to an embodiment of the invention.

FIGS. 3 and 4 show simplified cross-sections of printed circuit 30 of FIG. 2 according to two embodiments of printed circuit 30.

In the embodiment shown in FIG. 3, printed circuit 30 is formed of a rigid insulating support 34 comprising two opposite surfaces 36 and 38. Conductive tracks 40, for example, made of copper, are arranged on surface 36 and conductive tracks 42, for example, made of copper, are arranged on surface 38. A layer of a protection varnish may be provided on each surface 36, 38. Vias 44 crossing support 34 connect certain tracks 40 to tracks 42.

In the embodiment shown in FIG. 4, substrate 30 corresponds to a multilayer structure comprising a rigid insulating base structure 46 covered with a secondary insulating layer 48. Conductive tracks 50, for example, made of copper, are provided on base layer 46 and are covered with secondary layer 48. Conductive tracks 52 are arranged on secondary insulating layer 48. Vias 54 crossing secondary layer 48 connect certain conductive tracks 52 to tracks 50.

In FIG. 2, components 56 attached to printed circuit 30 have been schematically shown by rectangles. Further, display 18 may be attached to printed circuit 30 via a flexible printed circuit 58, or flex circuit, having its ends connected to display 18 and to printed circuit 30 via connectors 60, 62. The conductive tracks of printed circuit 30 taking part in the conventional operation of terminal 10 are not shown.

Protection device 32 comprises a capacitive position sensor 70 (Sensor) connected to a circuit of protection against an unauthorized access 71 (µP) by a connection 72, for example, a series connection. Sensor 70 for example corresponds to an integrated circuit of family CY8C20x34 sold under trade name Cap-Sense by Cypress Semiconductor Corporation.

Sensor 70 is connected to conductive tracks 74 supported by printed circuit 30 and preferentially distributed on said circuit according to the areas to be protected. Tracks 74 are insulated from one another and each track 74 has a free end. Preferably, tracks 74 extend substantially over the entire printed circuit 30, avoiding the locations above the components.

In particular, some conductive tracks 74 may extend at the level of flex circuit 58. In FIG. 2, conductive tracks 74 of two different levels have been shown in full lines and in dotted lines. As an example, when printed circuit 30 is made according to the embodiment shown in FIG. 3, conductive tracks 74 in full lines correspond to tracks 40 and conductive tracks 74 in dotted lines correspond to tracks 42. When printed circuit 30 is made according to the embodiment shown in FIG. 4, conductive tracks 74 in full lines correspond to tracks 52 and conductive tracks 74 in dotted lines correspond to conductive tracks 50. A ground plane may be provided at the level of the printed circuit 30 surrounding each conductive track 74 or some of them and connected to sensor 70.

When a via 44 or 54 connects two tracks in different levels, at least one of them has a free end. It can thus be considered that it is a same track made in several levels and having a free end.

Data can be exchanged between protection circuit 71 and a system external to terminal 10 over a connection 78, for example, a series or parallel connection. Data can be exchanged between sensor 70 and a system external to terminal 10 via connections 72, 78 and circuit 71.

As an example, sensor 70 is capable of detecting, for each conductive track 74, that a variation of the capacitance seen by conductive tracks 74 is occurring and of providing, in the case, to protection circuit 71, over connection 72, a fault signal representative of an identifier of conductive track 74 for which a capacitance variation is detected. Sensor 70 can successively check, track 74 after track 74, whether the capacitance seen by each track 74 has varied or not. As an example, sensor 70 provides a fault signal associated with a given track 74 when the difference (in absolute value) between the capacitance seen by conductive track 74 and a reference value is greater than a threshold. A more detailed description of an example of operation of sensor 70 is described in application notes AN 2393 and AN 14459 provided by Cypress Semiconductor Corporation.

When someone tries to access printed circuit 30, for example, by means of tools, the presence of the tool near printed circuit 30 causes a variation of the capacitance seen by at least one of conductive tracks 74 adjacent to the tool, which will be detected by sensor 70. The capacitance variation can be obtained without for the tool to be in contact with printed circuit 30. The detection of the capacitance variation of tracks 74 thus enables to detect that an access to package 12 is occurring.

A calibration of sensor 70 may be performed to set, for each conductive track 74, the reference capacitance value and the comparison threshold. A more detailed description of an example of calibration of sensor 70 is described in application note AN 42137 provided by Cypress Semiconductor Corporation. The calibration may be performed by connecting a system external to sensor 70 via connections 72, 78 and circuit 71.

Protection circuit 71 is capable of determining whether an unauthorized access to the inside of package 12 is occurring based on fault signals provided by sensor 70. When circuit 71 determines that an unauthorized access is occurring, it can make payment terminal 10 stop, have critical data stored in payment terminal 10 erased, etc.

In the present embodiment, detection circuit 71 comprises a memory 80 (MEM) in which several sets of conditions or parameters are stored. Each set of conditions corresponds to conditions based on which circuit 71 determines whether an authorized or unauthorized access is occurring when it receives one or several fault signals provided by sensor 70. At a given time, protection circuit 71 uses a single set of conditions. The sets of conditions can be modified by an external system connected to payment terminal 10 via connection 78. As an example, a set of conditions may comprise a list of the identifiers of conductive tracks 74 which must be taken into account for the detection of an unauthorized access. In this case, circuit 71 only determines that an unauthorized access is occurring if it receives a fault signal corresponding to an identifier belonging to the list. According to another example, a condition may correspond to a logic operation connecting identifiers of tracks 74. When protection circuit 71 successively receives fault signals associated with different tracks 74, it determines that an unauthorized access is occurring only if the logic operation linking the identifiers of these tracks is verified.

The use of sets of conditions enables to delimit, in simple and scalable fashion, areas of printed circuit 30 to which the access is desired to be prevented, from areas to which the access is desired to be authorized, even if conductive tracks 74 extend almost all over printed circuit 30. The delimitation of an area of printed circuit 30 to which the access is desired to be authorized can be obtained by a condition which indicates to circuit 71 not to detect an unauthorized access in the case where sensor 70 successively transmits fault signals corresponding to a determined set of tracks 74. As an example, in the case where the set of conditions indicates that an unauthorized access must be determined except in the case where sensor 70 transmits fault signals corresponding to tracks P1 and P2, this means that the access is not authorized for the portions of printed circuit 30 at the level of which conductive tracks 74 extend, except for the portion of printed circuit 30 in the vicinity of the crossing of tracks P1 and P2. The same partition may be obtained by providing two conductive tracks 74 sufficiently close to each other in the portion of printed circuit 30 to which the access is desired to be authorized. Conductive tracks 74 can then be of same "level".

A given partition of printed circuit 30 into authorized access areas and unauthorized access areas corresponds to a given set of conditions. Several sets of conditions, each corresponding to a specific partition, may be stored in memory 80 of protection circuit 71. Sensor 70 uses a single set of conditions at a given time. The partition of printed circuit 30 may be modified by the selection of the set of conditions used by circuit 71.

A partition of printed circuit 30 into authorized access areas and unauthorized access areas may be desirable in some cases. According to an example, in operation, it may be desirable to authorize an access to certain portions of printed circuit 30 to a user of terminal 10. As an example, a terminal 10 may comprise a SIM-type card (Subscriber Identity Module) specific to the user. It can then be desirable to authorize a change of SIM card by the user. The present invention advantageously enables to adapt the number and the position of the authorized access areas of terminal 10 according to the operating configuration of terminal 10. Thus, when terminal 10 comprises a SIM card, circuit 71 uses a set of conditions authorizing an access to the SIM card while when terminal 10 comprises no SIM card, circuit 71 uses a set of conditions authorizing no access to the location of printed circuit 30 at which, in the previously-described configuration, a SIM card is present. According to another example, in a maintenance operation, it is desirable to enable a qualified operator to access all or at least certain portions of printed circuit 30.

FIG. 5 shows, in the form of a block diagram, the steps of a method of use of printed circuit 30 of FIG. 2 according to an embodiment of the invention.

At step 90, the operating mode of protection circuit 71 is selected. This corresponds to the selection of the set of conditions stored in memory 80 to be used by circuit 71. This may be obtained by the connection of a system external to terminal 10 via connection 78. This may also be obtained by the keying in of a specific code via keyboard 20. The method carries on at step 92.

At step 92, during the operation of terminal 10, sensor 70 successively verifies whether the capacitance seen by each conductive track 74 varies. When such a variation is detected, sensor 70 provides protection circuit 71 with a fault signal representative of the conductive track 74 for which a detection has been performed. An access to circuit 30 may cause the successive transmission of several fault signals by sensor 70 associated with different conductive tracks 74. The method carries on at step 94.

At step 94, circuit 71 determines whether the access is authorized or not based on the selected set of conditions and based on the identifiers of conductive tracks 74 for each of which it has received a fault signal. If the access is authorized, no action is taken and the method carries on at step 92. If the access is not authorized, the method carries on at step 96.

At step 96, circuit 71 then carries out the steps of protection of printed circuit 30 on detection of an unauthorized access. They comprise, for example, the stopping of the operation of terminal 10, the erasing of certain data stored in memories connected to printed circuit 30, etc.

FIG. 6 shows, in the form of a block diagram, the steps of a method of use of printed circuit 30 according to another embodiment of the invention. Such a method comprises using protection device 32 at the end of the assembly of electronic components on printed circuit 30 to ascertain that all electronic components have been arranged properly. It enables, in a simple fashion, with no dedicated equipment, to verify that the printed circuit has been properly assembled.

The method starts at step 100 at which a training step which comprises, for a reference printed circuit 30 for which all components 56 have been properly arranged, calibrating sensor 70 of reference printed circuit 30 until no fault signal is transmitted, is carried out. The values of the calibration parameters obtained at the end of the calibration of the reference printed circuit are stored. The method carries on at step 102.

At step 102, when all the components are attached to a printed circuit 30 to be tested, an operation of calibration of sensor 70 of printed circuit 30 to be tested is performed based on the calibration parameters obtained at step 100. The method carries on at step 104.

At step 104, when certain components are not arranged properly on printed circuit 30 to be tested and/or when certain provided components are absent, the values of the capacitances seen by conductive tracks 74 adjacent to the locations of the improperly attached and/or missing components are different from the expected values. This difference is detected by sensor 70 which provides fault signals. The method carries on at step 106.

At step 106, an analysis of the fault signals provided by sensor 70 is performed via an external system connected to sensor 70 by connections 72, 78 and circuit 71. This analysis results in the determination of the missing or improperly assembled components.

The protection device is configurable, by the data contained in memory 80, to distinguish products (or systems) or families of products (or families of systems) from one another. Thus, the memory configuration enables to select the tracks for which a capacitance variation is taken into account. Based on a same structure, the circuit signature can thus be modified by simple configuration of memory 80. This makes a possible piracy even more difficult by suppressing the reproducibility from one circuit to another.

The fact of not providing tracks above the components is not disturbing in terms of security and avoids introducing stray capacitances into the circuit operation.

Specific embodiments of the present invention have been described. Various alterations and modifications will occur to those skilled in the art. In particular, although in the previously-described example, protection circuit 71 and sensor 70 have been described as separated circuits, it should be clear that these two circuits may at least partly be common. In particular, the storage and the use of sets of conditions may be performed by sensor 70.

The invention claimed is:

1. An electronic system comprising a printed circuit contained in a package and a protection device comprising:
    conductive tracks supported by the printed circuit and each of the conductive tracks having a free end;
    a first integrated circuit connected to the conductive tracks and the first integrated circuit capable of detecting a variation of the capacitance seen by each conductive track; and
    a second integrated circuit, confounded with the first integrated circuit, the second integrated circuit comprising a memory configurable to select some of the conductive tracks, the second integrated circuit being capable of determining that an authorized or unauthorized access is occurring from the detection of the variation of the capacitance seen by at least one of the selected conductive tracks,
    wherein the printed circuit is rigid, the electronic system comprising an electronic component connected to the printed circuit by a flexible printed circuit, at least one of said conductive tracks extending to the flexible printed circuit.

2. The electronic system of claim 1, wherein the memory configuration is different from one system to another or from one family of systems to another.

3. The electronic system of claim 1, wherein the pattern of said conductive tracks avoids the locations above the components supported by the printed circuit.

4. The electronic system of claim 1, wherein said conductive tracks are electrically isolated from one another and at least two of said conductive tracks overlap or are adjacent to a portion of the printed circuit.

5. The electronic system of claim 1, wherein the first integrated circuit is connected to the second integrated circuit by a series connection.

6. A method for determining an unauthorized access to a printed circuit contained in a package of an electronic system, comprising the steps of:
    providing conductive tracks, each conductive track having a free end and each conductive track extending at least to the printed circuit, a first integrated circuit connected to the conductive tracks, and a second integrated circuit, confounded with the first integrated circuit, the second integrated circuit comprising a memory, wherein the printed circuit is rigid, the electronic system comprising an electronic component connected to the printed circuit by a flexible printed circuit, at least one of said conductive tracks extending to the flexible printed circuit;
    storing into the memory parameters for selecting some of the conductive tracks;
    having the first integrated circuit detect, for each conductive track, whether the capacitance seen by the conductive track varies; and
    having the second integrated circuit determine that an authorized or unauthorized access is occurring from the detection of the variation of the capacitance seen by at least one of the selected conductive tracks.

7. The method of claim 6, wherein each conductive track has a corresponding identifier, the method comprising having the first integrated circuit transmit to the second integrated circuit the identifier of the conductive track for which the capacitance variation is detected.

8. The method of claim 7, wherein the parameters comprise at least a list of identifiers of at least some conductive tracks, the second integrated circuit determining that an authorized or unauthorized access is occurring if the identifier of the track for which the capacitance variation is detected belongs to the list.

9. The method of claim 7, wherein the parameters comprise at least one logic operation involving the identifiers of at least some of the conductive tracks, the second integrated circuit determining that an authorized or unauthorized access is occurring if capacitance variations are detected for the conductive tracks associated with said identifiers and if the logic operation is verified.

10. The method of claim 6, wherein several sets of parameters are stored in the memory, the method comprising providing the second integrated circuit with a signal for selecting a set of parameters from among said sets of parameters, said selected set of parameters being used by the second integrated circuit to determine that an authorized or unauthorized access is occurring.

11. The method of claim 6, wherein the selection of the conductive tracks differs according to the system or to the family of systems.

12. The method of claim 6, further comprising the steps of:
- determining calibration values based on a reference printed circuit;
- calibrating the first integrated circuit of the printed circuit based on said calibration values; and
- having the first integrated circuit transmit a fault signal in the case where it detects a variation of the capacitance seen by at least one of the conductive tracks.

* * * * *